INVENTOR.
ALFRED J. HUCK
BY

United States Patent Office 2,794,896
Patented June 4, 1957

2,794,896

TEMPERATURE COMPENSATED CONTROL MECHANISM FOR ELECTRIC BLANKET

Alfred J. Huck, St. Louis, Mo., assignor to Knapp-Monarch Company, St. Louis, Mo., a corporation of Delaware Application June 25, 1953, Serial No. 364,158

3 Claims. (Cl. 219—20)

The present invention relates to an improved temperature compensated control mechanism for an electric blanket characterized by the ability to control the blanket temperature at a fixed value which is modified in accordance with room temperature, thereby warming the sleeper to a substantially constant temperature irrespective of room temperature variations.

Briefly, the present invention is intended for use in conjunction with an electric blanket of the type having a heating element or resistance in which the resistance value rises as the temperature of the element increases. The unit includes a differential relay having a voltage coil or winding and a current coil or winding and in which a normally closed switch is opened upon predetermined current ratio in the two windings. The differential relay is connected in circuit with the blanket so that the current coil carries the blanket current and the voltage coil is responsive to the total voltage appearing across the blanket and the switch. When the blanket is energized, the effects of current flow in the current coil and current flow in the voltage coil are in relative balance. As the blanket heats, however, the resistance of the heating element increases, thereby decreasing the current flow in the current coil while the current flow in the voltage coil maintains its initial value. When the predetermined high temperature is reached in the heater, the resistance value is such that current flow in the current coil overpowers that in the voltage coil and thereby opens the switch to deenergize the heater. This action occurs positively since the switch opening action further reduces and ultimately entirely prevents any current flow in the current coil.

A timer switch having an actuating element and a switch element deenergizes the entire unit for a predetermined time following actuation of the differential relay. The actuating element of the timer switch is connected across the switch of the differential relay and the switch element of the timer switch is connected in series with the power source and the voltage coil of the differential relay.

The temperature value at which the differential relay deenergizes is varied in response to room temperature. This is accomplished by the use of temperature sensitive resistances located thermally remote from the blanket and operable to vary the relative current flow in the voltage coil and the current coil in accord with room temperature variations. The direction and amount of the current flow change is such that as the room cools the temperature of the heating element prior to actuation of the differential relay is increased just enough to maintain the same apparent temperature felt by the sleeper.

It is, therefore, a general object of the present invention to provide an improved control mechanism for an electric blanket which compensates for variations in room temperatures.

It is a further object of the present invention to provide a temperature compensated control device for an electric blanket utilizing a differential relay and temperature sensitive resistances to accomplish the requisite control action.

Still another object of the present invention is to provide an improved temperature compensated control device for an electric blanket in which the blanket is recurrently energized to a predetermined temperature to heat the same in a sequence of power pulses, the duration of the successive pulses being varied in accordance with blanket temperature and room temperature to maintain the same apparent temperature of the sleeping person.

An additional object of the present invention is to provide an improved temperature compensated control device for an electric blanket which is characterized by simplicity and inexpensive construction, reliability, ease of adjustment, and suitability for use in an electric blanket intended for domestic application.

The novel features which I believe to be characteristic of the present invention are set forth with particularity in the appended claims. My invention itself, however, both as to its organization and method of operation, together with further objects and advantages thereof, will best be understood by reference to the following description taken in connection with the accompanying drawings, in which:

Figure 1:
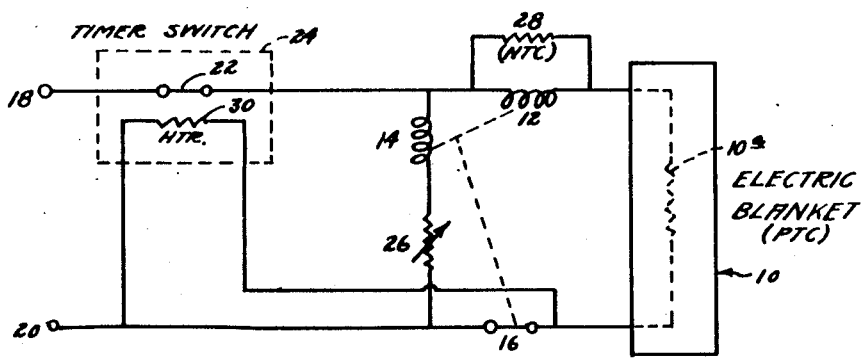
Figure 1 is a schematic circuit diagram of one form of the present invention.

Referring now to Figure 1, there is indicated generally at 10 an electric blanket of conventional construction having a heater or resistance element 10a with a positive temperature coefficient. Typically, this blanket might consist of a lengthy resistance wire embedded in a blanket cloth and extending over substantially the entire area of the blanket cloth. Current flowing through the wire thereby produces a heating effect distributed over the entire blanket and of value determined by the power losses in the heating element or resistance. Since the heater is of wire having a positive temperature coefficient or resistance, the resistance 10a increases in value as the blanket heats.

The voltage coil 14 and the current coil 12 define a differential relay in conjunction with the normally closed switch 16. This differential relay may, for example, consist of a magnetic core upon which both windings are wound and in which the current flow in winding 12 and the current flow in winding 14 produce opposing magnetic effects. In this form of the differential relay, the switch 16 includes a movable element carried by an armature which is moved from contact-making to contact-breaking condition when the difference between the magnetic effects of winding 12 and winding 14 exceeds a predetermined value.

The electric blanket 10 is energized from a power source connected across terminals 18 and 20. This source may, for example, be the 110-volt alternating current source available in homes. The heating circuit to the blanket may be traced from terminal 18 through the switch elements 22 of the timer switch 24, the current coil 12, the blanket, and then through switch 16 back to terminal 20.

The voltage coil 14 of the differential relay is connected in series with variable resistance 26 across the current coil 12, blanket 10, and switch contacts 16. Thus when the unit is energized, current flow takes place in coil 14 in accordance with the applied voltage and current flow occurs in winding 12 in accordance with the current taken by the blanket. So long as the blanket is not up to the predetermined high cut-off temperature, the current flow in voltage winding 14 is insufficient to pick up the switch 16 and it remains in the contact-making position. However, as the blanket heats up, the resistance 10a rises and the current flow in winding 12 falls. Eventually, when the temperature reaches the preset high cut-off value, the current flow in winding 12 is so reduced in relation to the current flow in winding 14 that the latter overpowers the former and actuates the switch 16 to the contact-breaking condition. At this time, the only current flow is that through the coil 14 and thus the contacts 16 are held in the contact-breaking or open position.

The temperature at which the differential relay opens switch 16 is manually adjustable by variation of the resistance 26. In addition, a resistance 28 having a negative coefficient of resistance is connected across winding 12 to shunt a portion of the current flow therethrough. This resistance is physically located remote from the blanket 10 and in a position to respond to room temperature. If room temperature falls, the value of this resistance rises. This causes a greater current flow in winding 12 in relation to the total current flow in resistance or heating element 10a. Since the winding 12 then has an increased current flow in relation to the heating current flow, the heating element 10a must rise to a higher temperature, and hence higher resistance, before the current flow therethrough falls to the value enabling current flow in winding 14 to overcome current flow in winding 12 and thereby open the switch 16. The value of the resistance 28 and its variation in resistance with temperature is so chosen that the compensation for room temperature variations thus achieved is that required to maintain the comfort and apparent temperature of the sleeper at a constant value notwithstanding room temperature variations. Thus, for example, if it is necessary to increase peak temperature of the blanket heater 10a one degree for each five degrees drop in room temperature, the resistance 28 is so proportioned that the winding 14 cannot overcome winding 12 until the blanket heater 10a has warmed to a one degree higher temperature for each five degrees temperature fall at resistance 28.

The timer switch 24 acts as a monitor to open and reclose the circuit at predetermined times after switch 16 is opened. This timer switch may be any one of many types and is shown for purposes of illustration as a so-called warp switch. This switch includes a bimetal switch blade 22 which, when heated to a predetermined temperature, flexes to a contact-breaking condition. This switch blade is heated by a resistance heater 30 which may, for example, be a wire wrapped about the switch blade itself, or, alternatively, a resistance located adjacent to the switch blade. The heater 30 operates as an actuating element to open the switch 22 when a predetermined voltage has been applied since the voltage causes heating current flow in heater 30. When the voltage is subsequently removed, the normally closed contact condition of switch 22 is restored as the bimetal switch blade cools again to the lower contact-making temperature.

The heater or actuating element 30 is connected across the switch 16. Thus when the differential relay opens the switch 16 and locks in open position by reason of the winding 14, the heater 30 is energized and heats itself and switch blade 22 until the switch blade 22 flexes to open circuit condition in response to the increased temperature. When the switch 22 opens the circuit, the current to heater 30 is interrupted inasmuch as the heater is energized from the circuit that can be traced from terminal 18 through switch 22, current winding 12, heater 10a, and heater 30 back to terminal 20. Thus the switch 22 cools and eventually is restored to its contact-making position. In the meantime, however, the switch 16 is restored to its normally closed position since the switch 22 interrupts the current flow to the winding 14. Thus when the switch 22 subsequently closes, the differential relay is in condition to energize the blanket heating element 10a until the latter again heats to the cut-off temperature and switch 16 opens to repeat the cycle. The heater 30 is short circuited by switch 16 until the latter opens.

It will be observed that the unit that has been described operates to energize the blanket 10 in a series of power pulses, each pulse continuing until the predetermined blanket temperature is reached. Thereafter, the timer switch 24 interrupts the circuit for a fixed period of time, during which the differential relay resets. The duration of the recurrent power pulses is automatically controlled in accord with the blanket temperature and in accord with room temperature so that the average heating energy or power being applied to the blanket is just that required to maintain the blanket at the value necessary to give the sleeper the apparent feeling that he is subject to a constant temperature despite variations in room temperature.

Figure 2:
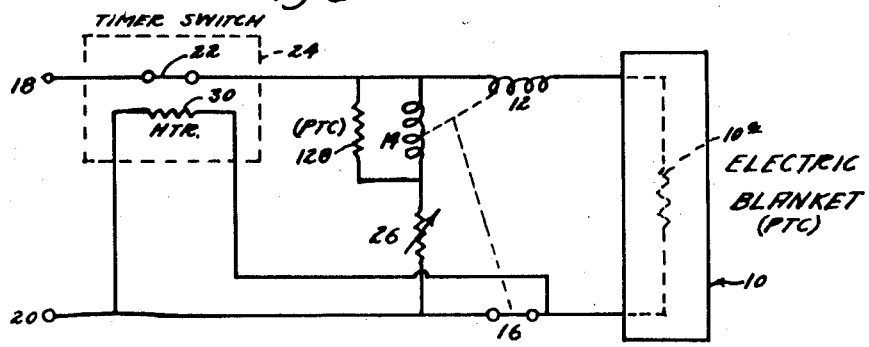
Figure 2 is a similar schematic circuit diagram of an alternative form of the present invention.

In the modified form of the invention shown in Figure 2, a positive temperature coefficient resistance 128 is connected in parallel relation to the voltage winding 14 and the negative temperature coefficient resistance 28 is omitted. The resistance value and temperature coefficient of resistance 128 is so chosen in relation to the impedance of winding 14 as to vary the current flow through winding 14 in just the amount required to change the cut-off temperature of the electric blanket as necessary to maintain an apparently constant temperature to the sleeper. The resistance 128 is located thermally remote from the blanket 10 and subject to room temperature. When the room temperature falls, the resistance 128 decreases in value and thereby reduces the current flow in winding 14 because of the increased voltage drop through adjusting resistance 26. This requires the current flow in winding 12 to fall to a lower value, with a consequent increase in the temperature of heater 10 before winding 14 overcomes winding 12 and switch 16 is opened.

Figure 3:
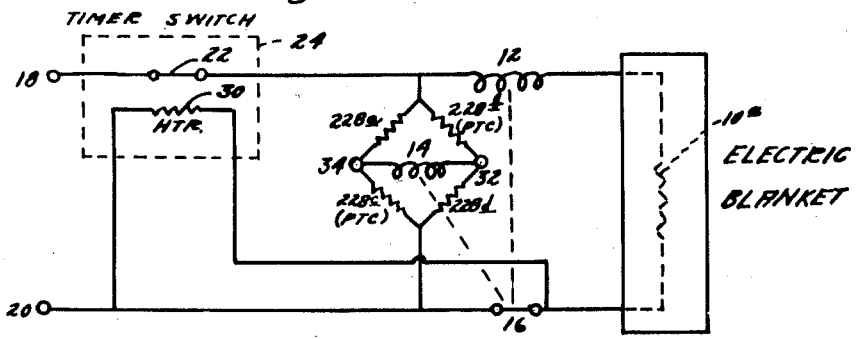
Figure 3 is a schematic circuit diagram of still another form of the present invention.

In the circuit of Figure 3, the voltage winding 14 is connected in a bridge circuit defined by resistances 228a, 228b, 228c, and 228d. This bridge is normally unbalanced, with the current flow through winding 14 normally occurring through resistance 228a, winding 14, and resistance 228d. These two resistances are of the type having a very low temperature coefficient of resistance. The resistances 228b and 228c have a comparatively high positive temperature coefficient of resistance. The latter two resistances are located thermally remote from the blanket and exposed to room temperature. Thus as room temperature falls, the resistance 228b drops in relation to resistance 228d and thereby causes terminal 32 to approach more closely to the voltage of terminal 18. Simultaneously the resistance 228c falls in value while resistance 228a remains nearly constant so that terminal 34 approaches more nearly to the voltage of terminal 20. This reduces the current flow in winding 14 in relation to the voltage across terminals 18 and 20 and thereby increases the resistance value of heater 10a at which the switch 16 opens.

Figure 4:
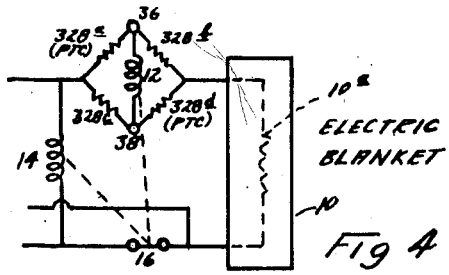
Figure 4 is a fragmentary schematic diagram of still another form of the present invention.

Figure 4 shows a further embodiment of the present invention in fragmentary form. In this arrangement the bridge defined by resistances 328a, 328b, 328c, and 328d and the current coil 12 is substituted for the parallel connection of coil 12 and resistance 28, Figure 1. This bridge is normally unbalanced and the resistances are so chosen that current flows through winding 12 in the direction from resistance 328a to resistance 328d. Resistances 328a and 328d have a positive temperature coefficient of resistance and are located thermally remote from the blanket 10 and are exposed to room temperature. As the room temperature rises, the values of these resistances rise and thereby cause decreased current flow through winding 12 in relation to the current flow through the blanket 10. The consequence of this action is to enable the voltage coil 14 to overcome the current coil 12 at a lower temperature of the element 10a and thereby reduce the power input to the blanket. The resistances are so proportioned so the reduction of peak temperature is of correct magnitude to maintain the user of the blanket at a constant temperature. The resistances 328b and 328c are constructed to have a small variation in resistance with temperature.

While I have shown and described bridge circuits in the embodiments of Figures 3 and 4 in which the temperature sensitive resistances have positive temperature coefficients and two such resistances are used in each case, it is possible to use a single temperature sensitive resistance in each case and, if desired, to use a resistance having a negative temperature coefficient rather than a positive coefficient. Alternatively, all four resistances of each bridge may be temperature sensitive, two with positive coefficients and two with negative coefficients. In addition, one or more of the resistances may be variable for convenient manual adjustment of regulated temperature.

It will be observed from the foregoing description that the mechanism of the invention is simple in construction and utilizes only the variation in temperature with resistance of the resistances 28, 128, 228b, and 228c to compensate for room temperature variations. The unit is simple in that it requires only the differential relay and the timer switch. It is positive in operation, since the differential relay positively locks out once the contacts begin to pick up. Moreover, the entire control function is achieved by sensing the resistance of the electric blanket and no sensing elements are required in the blanket itself.

The differential relay defined by windings 12 and 14 and by the switch 16 may be any one of many types known to the art. It is of the type that opens the normally closed switch 16 when the ratio of current in the current coil 12 to the current in the voltage coil 14 deviates to a predetermined extent from a normal balanced value existing when the blanket is unheated. In one type of differential relay this is accomplished by winding the coils on a magnetic core with the number of turns proportioned to give balanced magnetomotive forces when the blanket is unheated. The switch 16 is then actuated by an armature responsive to the magnetic flux in the core. Alternatively, the windings 12 and 14 may be heaters which warm suitable bimetals and the switch 16 is mechanically linked to the bimetals to respond to the difference or ratio of the flexure thereof. I have used the term winding herein to designate generally an actuating element of the differential relay, whether it is a coil, a resistance heater, or any other element by which the differential relay is actuated.

While I have shown and described specific embodiments of the present invention, it will, of course, be apparent that various modifications and alternative constructions may be made without departing from the true spirit and scope thereof. I, therefore, intend by the appended claims to cover all such modifications and alternative constructions as fall within the true spirit and scope of the invention.

What I claim as new and desire to secure by Letters Patent of the United States is:

1. A control mechanism for an electric blanket having a resistance heating element with a positive temperature coefficient of resistance, the mechanism comprising: a differential relay having a current winding and a voltage winding; means responsive to the ratio of current through the current winding to the current through the voltage winding and defining normally closed switch contacts movable to open position upon predetermined change in current ratio from a neutral value; means defining an energizing circuit to the blanket through the current winding and switch contacts in series relation with the blanket; means defining an energizing circuit to the voltage winding connected across at least the blanket and the switch contacts, the energizing circuits and voltage and current windings being proportioned to impart said neutral current ratio to the windings when the blanket is unheated and to open the switch contacts when a predetermined high temperature is exceeded in the blanket; a resistance having a preselected resistance rating and having a positive temperature coefficient of resistance and being connected in shunting relation to the voltage winding and located remotely from the electric blanket, and arranged to increase said high temperature value as the ambient temperature falls; and selectively variable impedance means in series with a plurality of circuits through the voltage winding and said last resistance and the said energizing circuit last mentioned.

2. A control mechanism for an electric blanket having a resistance heating element with a positive temperature coefficient of resistance, the mechanism comprising: a differential relay having a current winding and a voltage winding; means responsive to the ratio of current through the current winding to the current through the voltage winding and defining normally closed switch contacts movable to open position upon predetermined change in current ratio from a neutral value; means defining an energizing circuit to the blanket through the current winding and switch contacts in series relation with the blanket; means defining an energizing circuit to the voltage winding connected across at least the blanket and the switch contacts, the energizing circuits and voltage and current windings being proportioned to impart said neutral current ratio to the windings when the blanket is unheated and to open the switch contacts when a predetermined high temperature is exceeded in the blanket; a resistance having a preselected resistance rating and having a positive temperature coefficient of resistance and being connected in shunting relation to the voltage winding and located remotely from the electric blanket, and arranged to increase said high temperature value as the ambient temperature falls; selectively variable impedance means in series with a plurality of circuits through the voltage winding and said last resistance and the said energizing circuit last mentioned; and a timer switch having voltage responsive actuating means and switch contacts operable to open when a predetermined voltage is applied to the actuating means; and means connecting the actuating means across said first mentioned switch contacts to apply said predetermined voltage to the same when said first mentioned switch contacts open.

3. A control mechanism for an electric blanket having a resistance heating element with a positive temperature coefficient of resistance, the mechanism comprising: a differential relay having a current winding and a voltage winding; means responsive to the ratio of current through the current winding to the current through the voltage winding and defining normally closed switch contacts movable to open position upon predetermined change in current ratio from a neutral value; means defining an energizing circuit to the blanket through the current winding and switch contacts in series relation with the blanket; and means defining a bridge circuit having two pairs of opposed terminals; means connecting one pair of said opposed terminals across at least the blanket and the switch contacts; means connecting the voltage winding across the other pair of said opposed terminals, voltage and current windings and said bridge circuit being so proportioned as to impart said neutral current ratio to the windings when the blanket is unheated and to open the switch contacts when a predetermined high temperature is exceeded in the blanket, the arms of the bridge circuit including a temperature sensitive resistance located in thermally remote relation to the blanket and operable to decrease the current flow in the voltage winding in relation to the voltage across said one pair of opposed terminals as the temperature at said resistance falls.

References Cited in the file of this patent

UNITED STATES PATENTS

| | | |
|---|---|---|
| 1,183,814 | Haagn | May 16, 1916 |
| 1,276,589 | Steinmetz | Aug. 20, 1918 |
| 1,528,053 | Hands | Mar. 3, 1925 |
| 1,810,172 | Hayes | June 16, 1931 |
| 2,413,128 | Wills | Dec. 24, 1946 |
| 2,592,525 | Huck | Apr. 15, 1952 |
| 2,636,959 | Huck | Apr. 28, 1953 |
| 2,709,216 | Moran et al. | May 24, 1955 |

FOREIGN PATENTS

| | | |
|---|---|---|
| 487,563 | Great Britain | June 22, 1938 |